US012668316B2

(12) United States Patent
Tomei

(10) Patent No.: US 12,668,316 B2
(45) Date of Patent: Jun. 30, 2026

(54) COMPOSITE BODY PART COMPRISING METAL FILAMENTS FOR A ROAD VEHICLE, RELATIVE ROAD VEHICLE AND RELATIVE PRODUCTION METHOD

(71) Applicant: FERRARI S.P.A., Modena (IT)

(72) Inventor: Stefano Tomei, Modena (IT)

(73) Assignee: FERRARI S.P.A., Modena (IT)

( * ) Notice: Subject to any disclaimer, the term of this patent is extended or adjusted under 35 U.S.C. 154(b) by 336 days.

(21) Appl. No.: 18/319,627

(22) Filed: May 18, 2023

(65) Prior Publication Data

US 2023/0382469 A1     Nov. 30, 2023

(30) Foreign Application Priority Data

May 24, 2022     (IT) ........................ 102022000010733

(51) Int. Cl.
B32B 7/12          (2006.01)
B32B 5/24          (2006.01)
     (Continued)

(52) U.S. Cl.
CPC ............ B62D 29/043 (2013.01); B32B 5/245 (2013.01); B32B 5/262 (2021.05); B32B 7/12 (2013.01);
     (Continued)

(58) Field of Classification Search
CPC .... B62D 29/043; B62D 25/06; B62D 29/004; B62D 27/026; B62D 29/04; B32B 5/245;
     (Continued)

(56) References Cited

U.S. PATENT DOCUMENTS

2006/0160450 A1 *   7/2006   Chou ................... D03D 15/283
                                                              442/195
2021/0023830 A1     1/2021   Dodworth
                    (Continued)

FOREIGN PATENT DOCUMENTS

CN          102745247  A  * 10/2012
CN          109823012  A     5/2019
                    (Continued)

OTHER PUBLICATIONS

CN_102745247_A.*

(Continued)

*Primary Examiner* — Matthew D Matzek
(74) *Attorney, Agent, or Firm* — CANTOR COLBURN LLP

(57)          ABSTRACT

A body part for a road vehicle comprising an outer portion configured to be arranged on the outer side of a road vehicle and defining a first side of the roof panel; an inner portion configured to be arranged, with respect to the outer portion, towards a passenger compartment of the road vehicle and defining a second side of the roof panel; wherein the outer portion comprises one or more first composite material layers, each comprising a reinforcement texture; wherein the outermost layer of said one or more first composite material layers, i.e. the one visible, in use, from the outside of the road vehicle, comprises a plurality of metal filaments woven into the reinforcement texture.

12 Claims, 7 Drawing Sheets

(51) Int. Cl.
  *B32B 5/26* (2006.01)
  *B62D 25/06* (2006.01)
  *B62D 29/00* (2006.01)
  *B62D 29/04* (2006.01)

(52) U.S. Cl.
  CPC ........... *B62D 25/06* (2013.01); *B62D 29/004* (2013.01); *B32B 2262/103* (2013.01); *B32B 2262/106* (2013.01); *B32B 2262/128* (2021.05); *B32B 2266/08* (2013.01); *B32B 2305/022* (2013.01); *B32B 2305/188* (2013.01); *B32B 2307/102* (2013.01); *B32B 2307/718* (2013.01); *B32B 2307/7376* (2023.05); *B32B 2311/12* (2013.01); *B32B 2313/04* (2013.01); *B32B 2605/08* (2013.01)

(58) Field of Classification Search
  CPC ..... B32B 5/262; B32B 7/12; B32B 2262/103; B32B 2262/106; B32B 2262/128; B32B 2266/08; B32B 2305/022; B32B 2305/188; B32B 2307/102; B32B 2307/718; B32B 2307/7376; B32B 2311/12; B32B 2313/04; B32B 2605/08; B32B 2250/05; B32B 2255/02; B32B 2255/26; B32B 2262/148; B32B 5/024; B32B 5/10; B32B 5/12; B32B 5/26; B32B 7/02; B29C 69/00; B60R 13/0212; B60R 13/0815; B29L 2031/30

USPC ............... 442/203, 209, 210, 217, 228, 229; 428/292.1

See application file for complete search history.

(56) References Cited

U.S. PATENT DOCUMENTS

| | | | | |
|---|---|---|---|---|
| 2022/0339912 A1* | 10/2022 | Yoon | ........................ | B32B 7/02 |
| 2024/0034045 A1* | 2/2024 | Kamimura | .............. | B32B 37/06 |

FOREIGN PATENT DOCUMENTS

| | | | | | |
|---|---|---|---|---|---|
| KR | 20190051290 A | * | 5/2019 | ............ | B32B 5/024 |
| KR | 20200030772 A | | 3/2020 | | |

OTHER PUBLICATIONS

KR_20190051290_A.*

Extended European Search Report for European Application No. 23174502.7; Date of Mailing: Sep. 27, 2023, 8 pages.

Composite Envisions: "Copper Reflections Carbon Fiber Fabric 2×2 Twill 3k 50"/127cm 5.9oz/200gsm", Jul. 26, 2017 (Jul. 26, 2017), XP093007504, Retrieved from the Internet: URL:https:// compositeenvisions.com/product/copper-reflections-carbonfiber-fabric-2x2-twill-3k-50-127cm-5-9oz-200gsm/[retrieved on Dec. 13, 2022].

Italian Search Report for Application No. 102022000010733; Filing Date: May 24, 2022; Date of Mailing—Jan. 9, 2023, 23 pages.

* cited by examiner

COMPOSITE BODY PART COMPRISING METAL FILAMENTS FOR A ROAD VEHICLE, RELATIVE ROAD VEHICLE AND RELATIVE PRODUCTION METHOD

CROSS-REFERENCE TO RELATED APPLICATIONS

This patent application claims priority from Italian patent application no. 102022000010733 filed on May 24, 2022, the entire disclosure of which is incorporated herein by reference.

TECHNICAL FIELD

The invention relates to a composite body part provided with metal filaments for a road vehicle, to a relative road vehicle and to a relative method for the production of the body part.

In particular, the invention can advantageously, though not exclusively be applied to body parts for high-performance cars, to which explicit reference will be made in the description below without because of this losing in generality.

BACKGROUND OF THE INVENTION

As it is known, a road vehicle usually comprises a shell substantially consisting of a chassis and a body. The body comprises the outermost parts of the road vehicle, which, therefore, are visible to users. These parts typically also include the roof or roof panel, namely the element, usually shaped like a slightly curved panel, which fulfils the function of protecting the passengers of the road vehicle both from atmospheric agents and in case of tilting of the car.

In the majority of cases, the roof is made of metal, in particular sheet metal, preferably aluminium, to limit the weight thereof. In these cases, the latter is fixed to the rest of the shell by means of fixing devices, such as threaded members or rivets.

On the contrary, in other known cases, the roof can be made of a material other than metal, such as glass or composite material, for example comprising carbon fibres. In these cases, the roof is directly glued to the rest of the shell by means of an adhesive, a sealant or a glue.

In recent years, especially in high-performance vehicles, manufacturers have tried to reduce vehicle weights as much as possible, hence using composite materials such as carbon fibres to manufacture a large part of the body. However, in order to maintain a suitable thickness without decreasing the performances of the vehicle in aerodynamic and sound-damping terms, modern roofs generally consist of several elements.

Generally speaking, modern roofs are obtained by joining, in particular by peripherally gluing, for example by means of polyurethane glues, an outer element (also known as aesthetic coat or outer skin, for example made of aluminium), which has an aesthetic and aerodynamic function and is visible from outside the vehicle, and an inner element (also known as skeleton or inner skin), which has a strictly structural function (as a matter of fact, it usually has a greater thickness than the outer component) as well as a performance-related function. The skeleton usually faces the inside of the passenger compartment and comprises, for example, a net-like structure and/or one or more cross members (usually made of metal, for the very purpose of improving the rigidity of the roof panel), which are configured to stiffen the roof.

Carbon fibre roofs alone usually offer scarce performances from the point of view of soundproofing.

For this reason, some modern aluminium roofs further comprise a sound-absorbing material interposed between one cross member and the other.

Owing to the above, in the Applicant's opinion, known art solutions, despite being functional, can be subjected to improvements.

In general, a further weight reduction is needed, as well as a simpler assembling and better performance in terms of sound damping, in addition to a better feel of the occupants of the passenger compartment of the road vehicle, thus increasing comfort and, hence, the driving pleasure.

Furthermore, known roof or roof panels made of carbon fibres often are dark and opaque and, therefore, the visibility of the road vehicle in very dark conditions has to be improved.

DESCRIPTION OF THE INVENTION

The object of the invention is to provide a composite body part provided with metal filaments for a road vehicle, a relative road vehicle and a relative body part production method, which are at least partially free from the drawbacks described above and, at the same time, are simple and economic to be manufactured and implemented.

According to the invention, there are provided a composite body part provided with metal filaments for a road vehicle, a relative road vehicle and a relative body part production method as claimed in the independent claims attached hereto and, preferably, in any one of the dependent claims directly or indirectly depending on the independent claims.

The appended claims describe preferred embodiments of the invention and form an integral part of the description.

BRIEF DESCRIPTION OF THE DRAWINGS

Hereinafter, some embodiments of the invention will be described, in order to allow the latter to be better understood, by way of non-limiting example and with reference to the accompanying drawings, wherein.

EMBODIMENTS OF THE INVENTION

Figure 1:
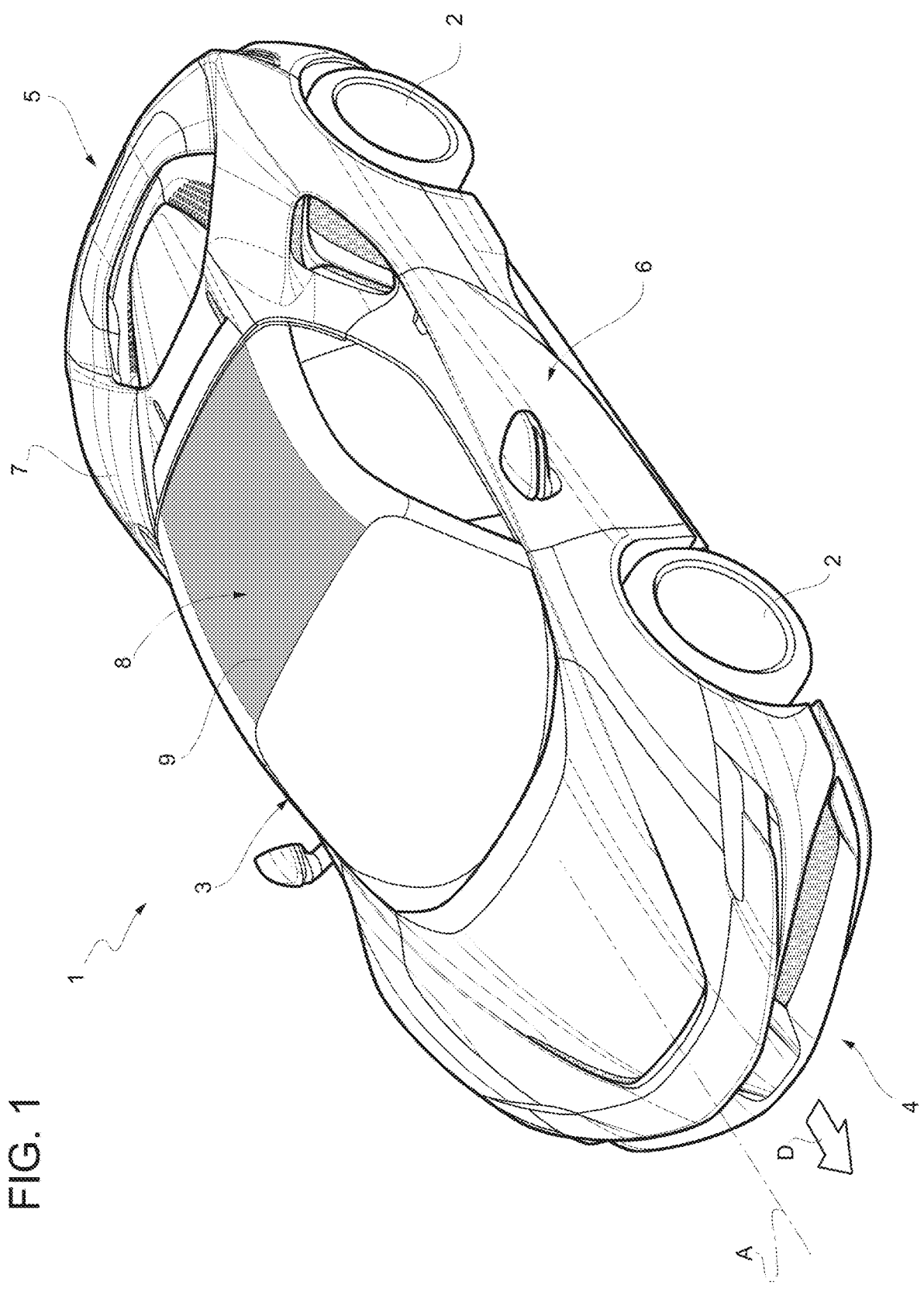
FIG. 1 is a schematic perspective view, with details left out for greater clarity, of a possible embodiment of a road vehicle according to the invention.

In FIG. 1, number 1 indicates, as a whole, a road vehicle provided with two front wheels 2 and with two rear wheels 2 (in particular, drive wheels). The vehicle 1 is provided with a passenger compartment 3, which is designed to accommodate at least one driver and, preferably, one or more passengers.

In the figures, the same numbers and the same reference letters indicate the same elements or components with the same function.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another or be isolated from one another, without for this reason going beyond the scope of protection of this patent application, as described hereinafter.

The road vehicle 1 has a front part 4 and a rear part 5, according to its forward driving direction D, represented in FIG. 1 along a straight longitudinal axis A.

Furthermore, the road vehicle 1 comprises a chassis (of the known kind and, therefore, not shown in detail) and a shell 6 comprising a body 7 fixed to the chassis.

The body 7 comprises the outermost parts of the road vehicle 1, which, therefore, are visible from the outside of the vehicle 1.

The body 7 comprises at least one body part 8 as described hereinafter.

In particular, advantageously, though not necessarily, and as shown in the non-limiting embodiments of the accompanying figures, the body part 8 comprises/is a vehicle roof 9, which delimits the passenger compartment 3 at the top.

In other non-limiting cases, which are not shown herein, the body part 8 is different from the vehicle roof 9.

Hereinafter, the term "roof panel" should be considered as equivalent to "roof".

Advantageously, though not necessarily, the body part 8, for example the roof 9, is fitted to the rest of the road vehicle 1 (for instance, to a structural skeleton) by means of peripheral gluing, e.g. by means of a (two-component) epoxy glue.

Figure 2:
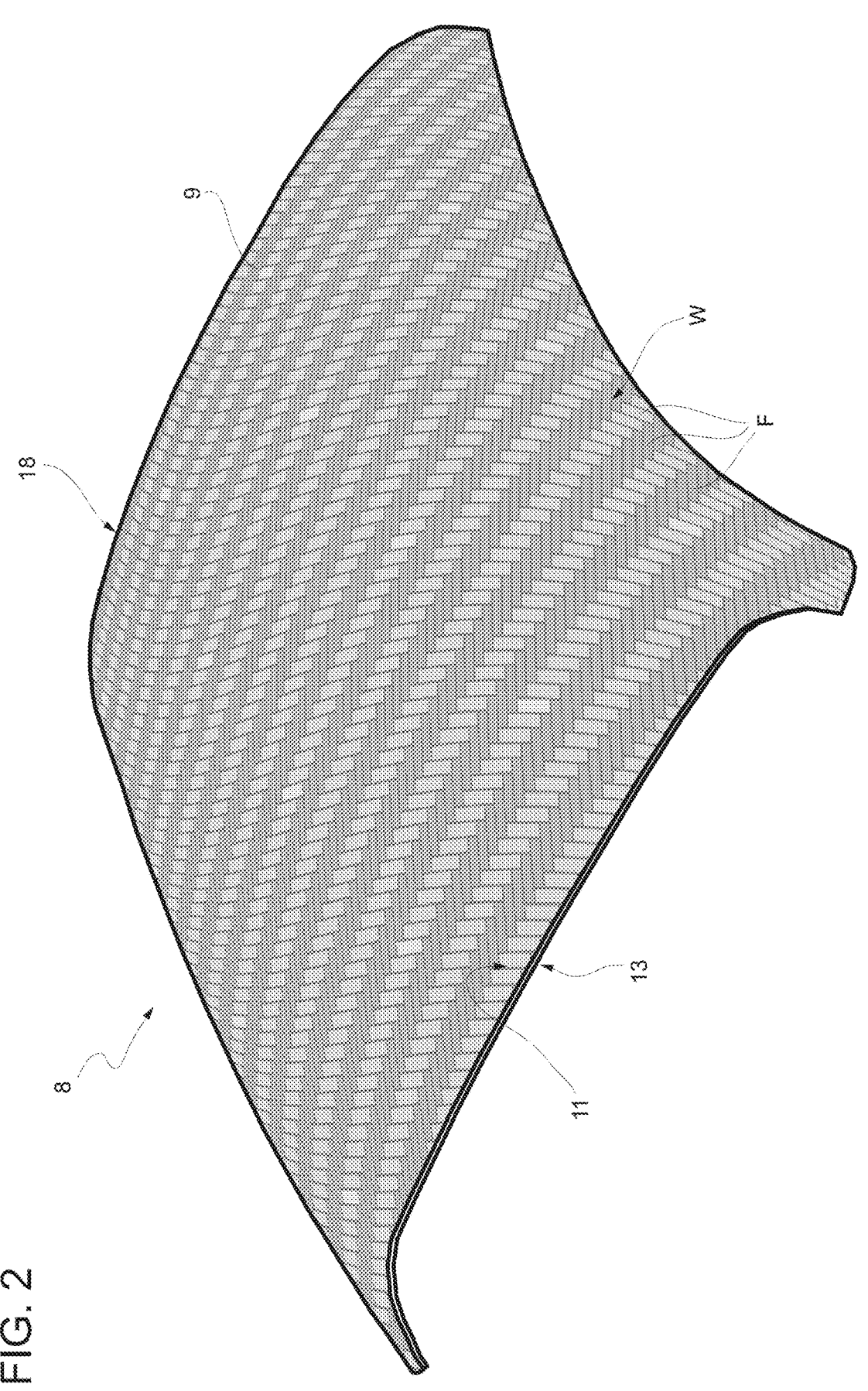
FIG. 2 is a schematic perspective view of a roof panel according to a possible embodiment of the invention.
Figure 3:
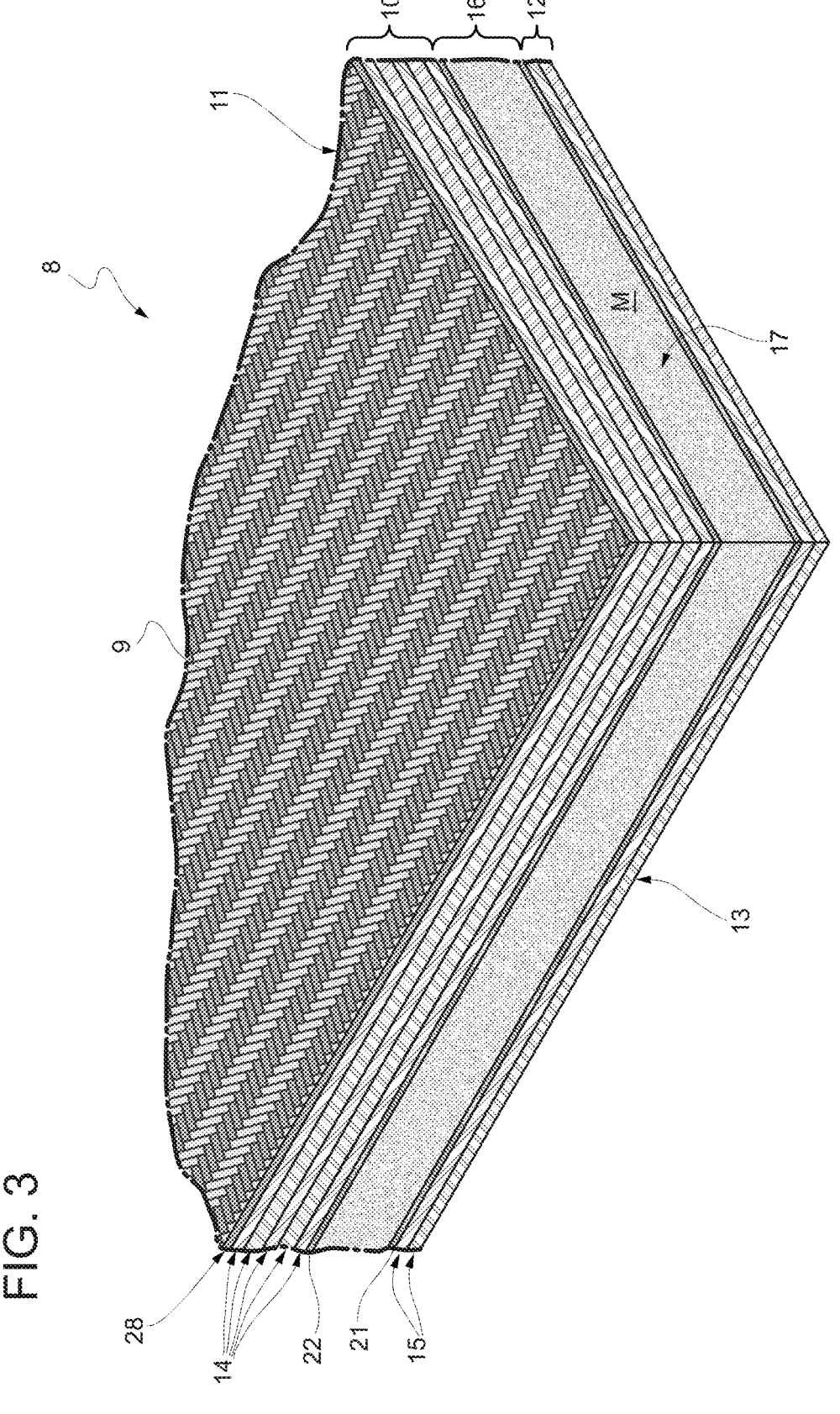
FIG. 3 is a perspective sectional view of the roof panel of FIG. 2.
Figure 4:
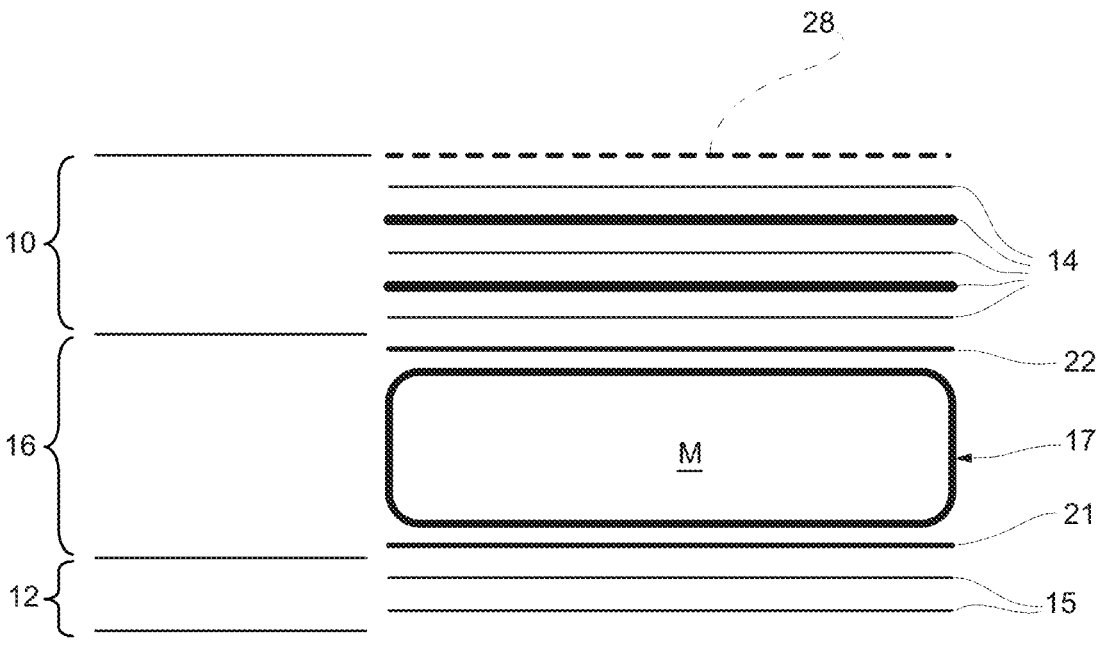
FIG. 4 is a schematic sectional side view of the roof panel of FIG. 3.

In particular, the body part 8 comprises an outer portion which is configured to be arranged on the outer side of the road vehicle 1 and defines a first side 11 of the body part 8 (for example, of the roof 9, as shown in FIGS. 2 to 4).

Furthermore, the body part 8 comprises an inner portion 12, which is configured to be arranged, with respect to the outer portion 10, towards the passenger compartment 3 of the road vehicle 1 and defines a second side 13 of the body part 8 (for example, of the roof 9, as shown in FIGS. 2 to 4).

In other words, the first side is the one that is visible from the outside of the road vehicle 1, whereas the second side is the one that is visible from the inside of the passenger compartment 3 of the road vehicle 1.

As shown in the non-limiting embodiments of FIGS. 3 to 6, the outer portion 10 preferably comprises one or more first composite material layers 14. In particular, each one of the first layers 14 comprises a reinforcement texture W (namely, a criss-cross of fibres, for example carbon fibres, intertwined with one another).

In addition, advantageously, though not necessarily, the inner portion 12 also comprises one or more second composite material layers 15.

Advantageously, though not necessarily, the body part 8 further comprises an intermediate portion 16, which is arranged between the outer portion 10 and the inner portion 12. In particular, the intermediate portion 16 comprises, in turn, a layer 17 of sound-absorbing material M (preferably, in the form of a panel). The term "sound-absorbing" identifies a material M that is capable of absorbing sound waves, preventing part of them from bouncing on surfaces and reflecting themselves in the surrounding environment in the form of reverberation and echoes, thus improving the acoustic comfort of the vehicle 1 (in particular, of the passenger compartment 3). In quantitative terms, the term "sound-absorbing" indicates, in this disclosure, a material with a sound-absorption class ranging from A to D (calculated according to standard UNI EN ISO 11654:1998).

According to the non-limiting embodiments of FIGS. 3 to 6, the inner portion 12, the intermediate portion 16 and the outer portion 10 are integrally coupled together, thus forming a single multilayer body 18.

Figure 5:
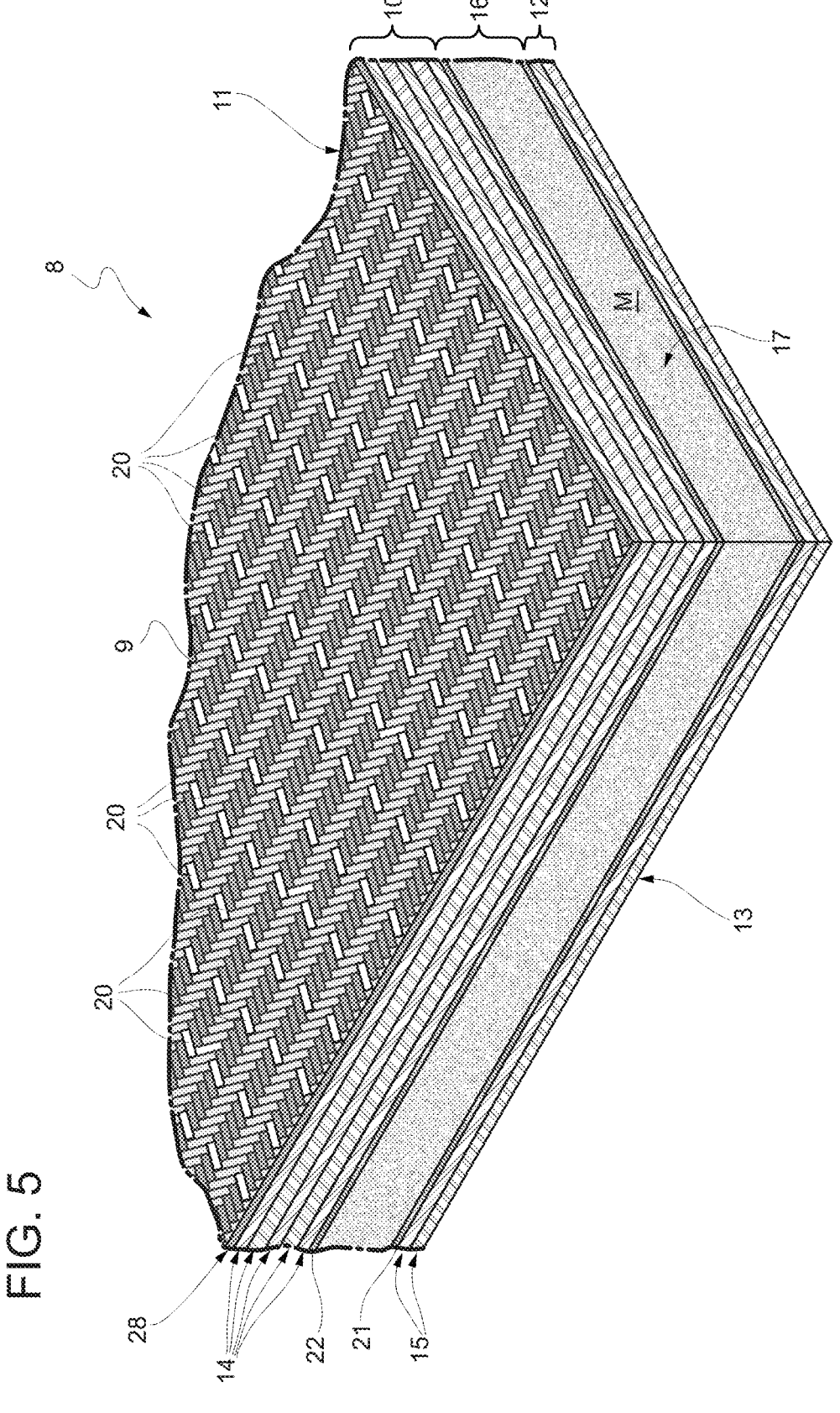
FIG. 5 is a perspective sectional view of a body part according to a further embodiment of the invention.
Figure 6:
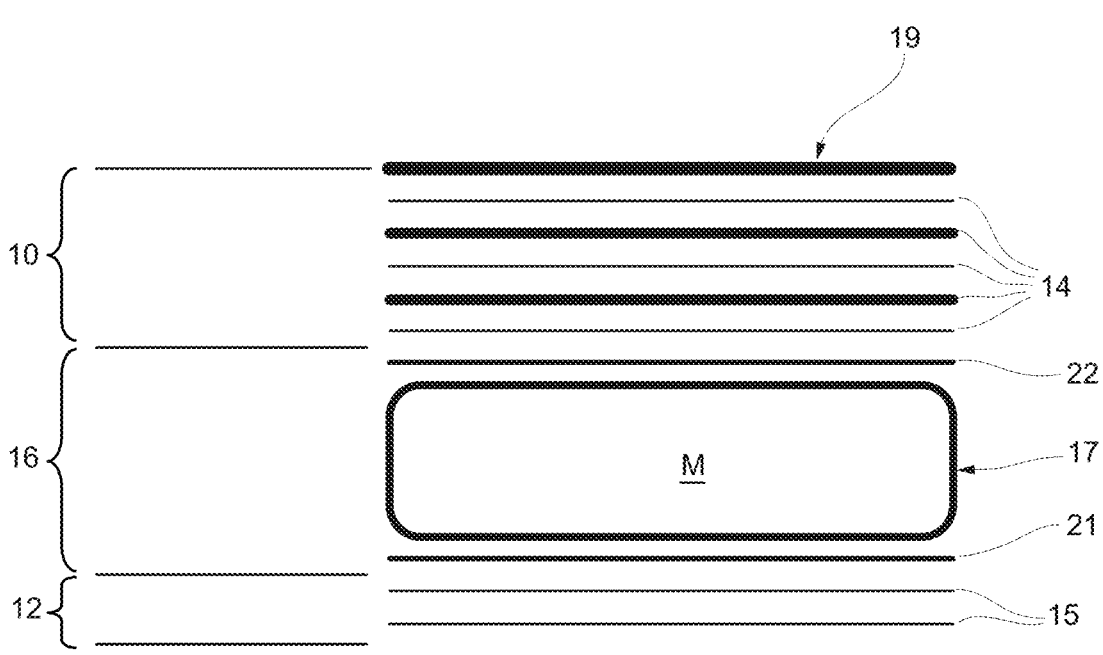
FIG. 6 is a schematic sectional side view of the body part of FIG. 5.

According to some non-limiting embodiments, like the ones shown in FIGS. 5 and 6, the outermost layer 19 of said one or more first composite material layers 14, namely the layer that is visible, in use, from the outside of the road vehicle 1, comprises a plurality of metal filaments 20 woven into the reinforcement texture W. In this way, the body part 8, whether it is a roof 9 or any other part of the body or the body as a whole, makes the vehicle 1 visible to a greater extent as well as more easily visible in conditions of darkness, thus increasing the safety and, at the same time, the possibility of identifying the road vehicle 1.

According to some preferred non-limiting embodiments, the metal filaments 20 are made of copper or of an alloy thereof.

According to other non-limiting embodiments, the metal filaments 18 are made of gold, silver, platinum, tin, zinc or alloys thereof.

Advantageously, though not necessarily, and as shown in the non-limiting embodiment of FIG. 5, the reinforcement texture W comprises a carbon fibre cloth, across whose fibres F the metal filaments 20 are woven.

In particular, the fibres of the cloth are woven with a 0°/90° orientation between the fibres F making up the weft and the ones making up the warp of the cloth, namely in two different directions.

In some non-limiting cases, like the one shown in the figure, the metal filaments 18 are woven in one single direction, namely together with the fibres F making up the weft or the fibres making up the warp of the fibre cloth.

In other non-limiting cases, which are not shown herein, the metal filaments 18 are woven in both directions, namely together with the fibres F making up the weft and the fibres making up the warp of the fibre cloth.

Advantageously, though not necessarily, the metal filaments 18 have a thickness that is equal to or greater than the one of the carbon fibres F making up the cloth.

According to some preferred non-limiting embodiments, like the ones shown in FIGS. 3 to 6, the sound-absorbing material is a closed cell foam, in particular an expanded resin, preferably a thermoplastic resin.

Preferably, in order to allow for a mounting procedure that is consistent with other types of roof, for example with a glass roof, the layer 17 of sound-absorbing material M has a thickness of 8 mm or less, preferably of 6 mm or less, in particular of circa 4 mm.

Advantageously, though not necessarily, and as shown in the non-limiting embodiments of FIGS. 4 and 6, the intermediate portion 16 and the inner portion 12 are coupled to one another by means of a first adhesive film 21 arranged between them.

Advantageously, though not necessarily, and as shown in the non-limiting embodiments of FIGS. 4 and 6, the intermediate portion 16 and the outer portion 10 are coupled to one another by means of a second adhesive film 22 arranged between them.

In some preferred non-limiting cases, the outer portion 10 comprises (besides the outermost layer 19 with metal filaments 20, if present) an odd number of first composite material layers 14, in particular at least three, preferably five as shown in the non-limiting embodiments of FIGS. 3 to 6. In this way, it is possible to maintain a structural symmetry of the outer portion 10.

In other preferred non-limiting cases, which are not shown herein, the outer portion 10 comprises (the outermost layer 19 with metal filaments 20, if present, included) an odd number of first composite material layers 14, in particular at least three, preferably five as shown in the non-limiting embodiments of FIGS. 3 to 6. In this way, it is possible to maintain a symmetry of the entire outer portion 10.

Advantageously, though not in a limiting manner, according to the disclosure above, the outer portion 10 comprises (besides the outermost layer 19 with metal filaments 20, if present) at least two, preferably three (FIGS. 4 and 6), first composite material layers 14' with at least a first grammage and at least one, preferably two (FIGS. 4 and 6), first composite material layers 14" with a second grammage, which are alternated with one another. The term grammage indicates the weight of the fibre F cloth expressed in grams per square metre.

In particular, the first grammage is smaller than the second grammage. In this way, it possible to obtain, by means of the second grammage, structural performances that would not be possible with the first grammage, whereas the first grammage meets the aesthetic requirements usually set for these composite materials. Therefore, advantageously, though not necessarily, the outer layers of the outer portion 10 have the first grammage.

Preferably, though not in a limiting manner, the first grammage ranges from 200 g/m2 to 300 g/m2, whereas the second grammage ranges from 300 g/m2 to 500 g/m2.

For the same symmetry- and aesthetic sense-related reasons, the inner portion 12 preferably comprises at least two second composite material layers having a grammage ranging from 200 g/m2 to 300 g/m2, namely with the first grammage of the outer layers of the outer portion 10.

According to a further aspect of the invention, there is provided a method for the production of the body part 8 (for example, of the roof 9 or roof panel) according to the disclosure made so far.

Figure 7:
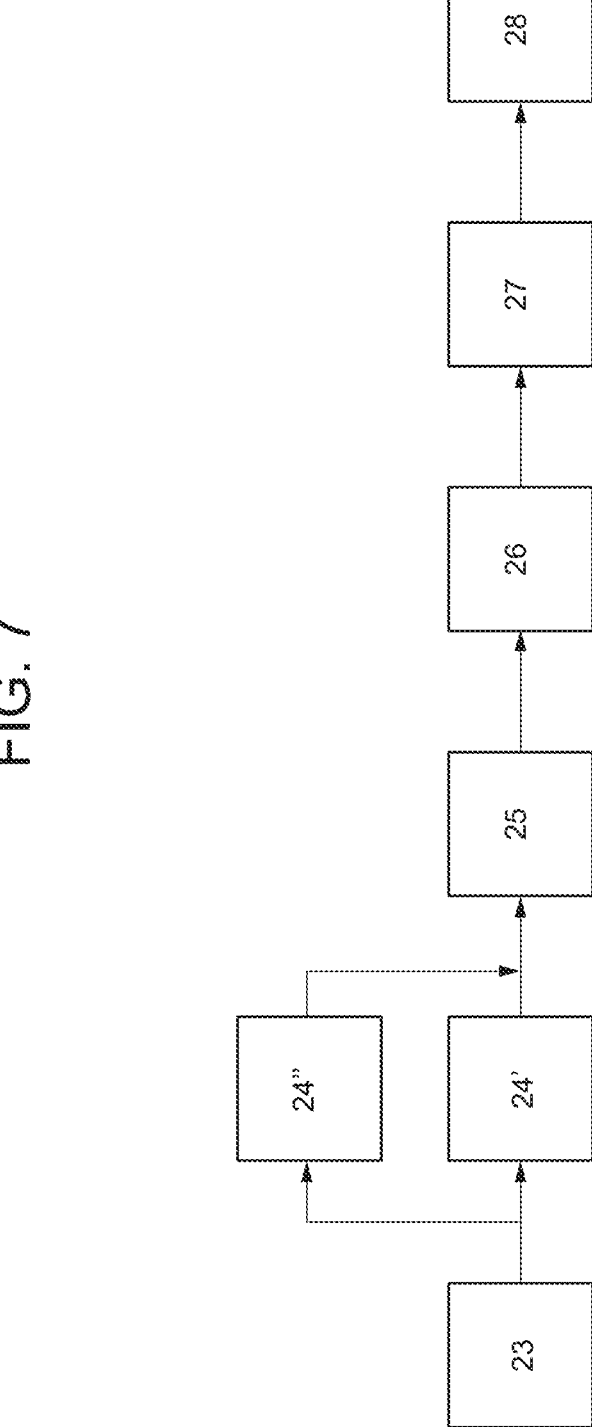
FIG. 7 is a block diagram showing the steps of a production method according to the invention.

In particular, some of the main steps of the method are shown in the block diagram of FIG. 7.

The method comprises a lamination step 23, during which said one or more composite material layers 14 of the outer portion 10 are shaped through lamination on a dedicated mould (of the known kind, for example with the shape of a roof 9, and therefore not described more in detail below).

Furthermore, the method comprises a first forming step 24 (to generically indicate steps 24', 24" of FIG. 7), which is subsequent to the first lamination step 23 and during which the outer portion 10 is formed.

In some non-limiting cases, the first step 24' entails forming the outer portion 10 by means of a hot pressing station (of the known kind and, therefore, not described more in detail below, namely without an autoclave cycle) for hot pressing said one or more composite material layers 14. Hot pressing is preferable, though not in a limiting manner, in case the outermost layer 19 provided with metal filaments 20 is not present.

In other non-limiting cases, the first step 24" entails forming the outer portion 10 by means of an autoclave cycle (of the known kind and, therefore, not described more in detail) for said one or more composite material layers 14. Autoclave forming of the pouter portion 10 is preferable, though not in a limiting manner, in case the outermost layer 19 provided with metal filaments 20 is present.

The method further comprises a coupling step 25, which is subsequent to the first lamination step 23 and to the forming step 24 and during which the layer 17 of sound-absorbing material M and said one or more second composite material layers 15 of the inner portion 12, which preferably are directly shaped on the previously formed inner portion 10, are coupled to the outer portion 10.

Finally, the method comprises a second forming step 26, which is subsequent to the coupling step 25 and during which the single multilayer body 18 is formed by placing the previously coupled outer portion 10, intermediate portion 16 and inner portion 12 in an autoclave. This step is preferably applied regardless of the first forming step 24 used.

Advantageously, though not necessarily, during the coupling step 25, the intermediate portion 16 is coupled to the inner portion 12 and to the outer portion 10 by means of the first adhesive film 21 and the second adhesive 22, respectively.

In some non-limiting cases, the method further comprises a coating step 27, during which the body part 8 is coated with an aesthetic or transparent film 28 or a paint.

Finally, the method subsequently comprises a mounting step 29, during which the body part 8 is mounted on the rest of the road vehicle 1, for example by means of sealing adhesives or other fixing elements.

In use, the single multilayer body 18 is easier to be mounted and has the same thickness as a glass roof, thus adjusting to all assembling procedures and improving, at the same time, the performances of the road vehicle 1 in terms of damping of the noise coming from the outside.

In particular, experimental tests have shown that, given the same total thickness, the body part 8, in particular the roof 9, reaches a weight that is 25% smaller than a corresponding roof made of aluminium currently used (provided with a skeleton and possible cross members).

Even though the invention described above specifically relates to a precise embodiment, it should not be considered as limited to said embodiment, for its scope of protection also includes all those variants, changes or simplifications covered by the appended claims, such as for example a different type of road vehicle (for instance, a front-drive vehicle), a different shape of the body part, a different composition of the materials, etcetera.

The body part, the vehicle and the method disclosed above have many advantages.

First of all, they lighten the structure of the road vehicle, thus improving the performances thereof with the same expressed power.

Furthermore, they simplify the installation of the body part, since it basically consists of the sole multilayer body.

A further advantage of the invention lies in the fact that, thanks to the presence of the sound-absorbing material M, which is integrated in the single multilayer body, the performances of the vehicle in terms of sound damping are significantly improved because of the fact that the panel of sound-absorbing material M is continuous, for example, along the entire extension of the roof, without interruptions due to the presence of skeleton nets or cross members.

In addition, in case the outer layer provided with metal filaments is present, the vehicle can more easily be identified even in extremely dark conditions, thus increasing the safety of the vehicle and of the passengers, besides making the road vehicle itself more likeable and luxurious.

LIST OF THE REFERENCE NUMBERS OF THE FIGURES 1 vehicle
2 wheels
3 passenger compartment
4 front part
5 rear part
6 shell
7 body
8 body part
9 roof
10 outer portion
11 first side
12 inner portion
13 second side
14 first layers
15 second layers
16 intermediate portion
17 sound-absorbing layer
18 single multilayer body
19 outermost layer
20 metal filaments
21 first adhesive film
22 second adhesive film
23 first lamination step
24 first forming step
25 coupling step
26 second forming step
27 coating step
28 aesthetic film
29 mounting step
A longitudinal axis
D forward driving direction
F fibre
M sound-absorbing material
W reinforcement texture

The invention claimed is:

1. A body part for a road vehicle (1) comprising:
an outer portion (10) configured to be disposed outwardly of a road vehicle (1) and defining a first side (11) of the body part;
an inner portion (12) configured to be arranged, with respect to the outer portion (10), towards a passenger compartment (3) of the road vehicle (1), and defining a second side (13) of the body part; and
an intermediate portion (16) disposed between the inner portion (12) and the outer portion (10); wherein the intermediate portion (16) comprises a layer (17) of sound-absorbing material (M) formed of a continuous closed cell foam;
wherein the outer portion (10) comprises a plurality of first composite material layers (14), each comprising a reinforcement texture (W) formed of a carbon fiber fabric (F), wherein an outermost layer (19) of the outer portion (10), which is visible from outside of the road vehicle when in use, further comprises a plurality of metal filaments woven into the reinforcement texture (W), wherein the plurality of metal filaments (20) have a thickness equal to or greater than the carbon fiber fabric (F),
wherein the first composite material layers (14) underlying the outermost layer (19) comprise an odd number of alternating first composite material layers of a first grammage and a second grammage, wherein the grammage indicates a weight of the respective carbon fiber fabric (F) of each first composite material layer, and wherein the inner portion (12), the intermediate portion (16) and the outer portion (10) are solidly coupled together forming a single multilayer body (18), and wherein the outermost layer (19) is resin impregnated and integrally formed as part of the multilayer body (18).

2. The body part according to claim 1, wherein the metal filaments (20) are made of copper.

3. The body part according to claim 1, wherein the metal filaments (20) are woven between fibers (F) of the carbon fiber fabric.

4. The body part according to claim 1, wherein the inner portion (12) comprises at least one or more second composite material layers (15).

5. The body part according to claim 4, wherein the layer of sound-absorbing material (M) has a thickness of 8 mm or less.

6. The body part according to claim 4, wherein the intermediate portion (16) and the inner portion (12) are coupled to each other by means of a first adhesive film (21) disposed therebetween; and wherein the intermediate portion (16) and the outer portion (10) are coupled to each other by means of a second adhesive film (22) disposed therebetween.

7. The body part according to claim 1, wherein the outer portion (10) comprises, in addition to the outermost layer (19) at least two first composite material layers (14) having at least a first grammage and at least one first composite material layers (14) having a second grammage, which are arranged alternately; wherein the first grammage is from 200 $g/m^2$ to 300 $g/m^2$, and the second grammage is from 300 $g/m^2$ to 500 $g/m^2$; and, wherein the inner portion (12) comprises at least two second composite material layers (15) made with a grammage from 200 $g/m^2$ to 300 $g/m^2$.

8. A method for producing the body part according to claim 1 comprising:
a lamination step, during which the one or more first composite material layers (14), included the outermost layer (19) comprising metal filaments (20), of the outer portion (10) are shaped by lamination on a special mould;
a first forming step (24), subsequent to the lamination step (23), during which the outer portion (10) is formed by at least one autoclave cycle of the one or more first composite material layers (14);
a coupling step (25), subsequent to the first forming step (24), during which the layer of sound-absorbing material (M) and the one or more second layers (15) of composite material of the inner portion are coupled to the outer portion (10), and shaped on the previously formed inner portion (12);
a second forming step (26), following the coupling step (25), during which the single multilayer body (18) is formed by arranging the previously coupled outer portion (10), the intermediate portion (16) and the inner portion (12) in an autoclave.

9. The method according to claim 8, wherein, during the coupling step (25), the intermediate portion (16) is coupled to the inner portion (12) and to the outer portion (10) by means of a first adhesive film (21) and a second adhesive film (22), respectively.

10. A road vehicle (1) comprising:
two pairs of wheels (2), of which at least one pair of the two pairs of wheels (2) is driven;

a shell comprising a body (7);

the road vehicle (1) being characterised in that the body (7) comprises at least one body part according to claim 1.

11. The road vehicle (1) according to claim 10, wherein the body part is a vehicular roof (9).

12. The road vehicle (1) according to claim 11, wherein the vehicular roof (9) is mounted to the rest of the vehicle (1) by perimeter bonding.

\* \* \* \* \*